United States Patent [19]
Kato et al.

[11] Patent Number: 5,637,969
[45] Date of Patent: Jun. 10, 1997

[54] VIBRATION CONTROL METHOD

[75] Inventors: Tetsuaki Kato, Hadano; Soichi Arita, Yamanashi, both of Japan

[73] Assignee: Fanuc Ltd., Japan

[21] Appl. No.: 314,268

[22] Filed: Sep. 30, 1994

[30] Foreign Application Priority Data

Oct. 1, 1993 [JP] Japan .................. 5-269697

[51] Int. Cl.$^6$ ..................... H02P 7/00
[52] U.S. Cl. .............. 318/432; 318/560; 318/561; 318/567; 318/568.1; 318/568.11; 318/568.18; 318/568.2; 318/568.21; 318/568.23; 318/569; 318/600; 318/610; 318/609; 318/434
[58] Field of Search .................. 318/560, 561, 318/567, 568.1, 568.11, 568.12, 568.18, 568.2, 568.21, 568.22, 568.23, 569, 600, 610, 609, 432, 434; 364/174; 901/3, 9, 23, 31, 32; 388/800

[56] References Cited

U.S. PATENT DOCUMENTS

| | | | |
|---|---|---|---|
| 4,594,671 | 6/1986 | Sugimoto et al. | 318/568.11 X |
| 4,816,734 | 3/1989 | Kurakake et al. | 318/561 X |
| 5,115,418 | 5/1992 | Shimada | 318/568.18 X |
| 5,331,265 | 7/1994 | Torii et al. | 318/610 |
| 5,341,078 | 8/1994 | Torii et al. | 318/568.22 |
| 5,418,440 | 5/1995 | Sakaguchi et al. | 318/560 |

FOREIGN PATENT DOCUMENTS

WO 91/03780  3/1991  WIPO.

*Primary Examiner*—Karen Masih
*Attorney, Agent, or Firm*—Staas & Halsey

[57] ABSTRACT

A control method capable of preventing vibration of a control object and making a band sufficiently high in controlling a robot or a machine tool in semi-closed loop. A torque command u" is obtained by executing a feedback-control of the servomotor using the position and speed of a servomotor in the same manner as in the conventional method. A displacement amount d1 between the motor position and the position of the control object and a displacement speed d2 are estimated by an observer. A corrected torque command u is determined by subtracting, from the torque command u", values obtained by multiplying the displacement amount d1 and the displacement speed d2 by the adjustable gains ($\alpha-K_pK_1$) and ($\beta-K_1$), respectively. The servomotor is driven based on the corrected torque command u thus obtained. There can be obtained effects equivalent to those that would be obtained when a feedback-control is performed using the position and speed of the control object. The adjustment values $\alpha$ and $\beta$ are so adjusted as to stabilize a response from the corrected torque command to the control object.

3 Claims, 3 Drawing Sheets

VIBRATION CONTROL METHOD

BACKGROUND OF THE INVENTION

1. Field of the Invention

The present invention relates to a control method of a robot and a machine tool and, more specifically, to a method which prevents vibration from occurring at the tip of a robot arm, a machining point of a workpiece attached to a machine tool, or a tool position when the robot or machine tool is controlled by a semi=closed loop.

2. Description of the Related Art

In robots and machine tools, there are provided detectors for detecting the position and speed of servomotors for driving a robot or a machine tool. The position and speed of a final control object, i.e., the tip of a robot arm (tool center point), a work, a tool, or the like are controlled by controlling the position and speed of the servomotors. That is, the control of robots and machine tools is usually performed by a semi-closed loop.

However, the servomotor is linked to the control object such as the tip of a robot arm, a workpiece or a tool through speed reducers, arms and other members. That is, the mechanism from the motor to the control object is not regarded as a complete rigid body. As a result, there some times occurs an overshoot or vibration at the control object such as an arm tip during acceleration or deceleration.

FIG. 3 is a schematic diagram of a spring and damper system which is modelled to represent a vibration system including an arm, a speed reducer, etc. In FIG. 3, $\theta L$ represents the position of a control object such as an arm tip; $\theta m$, the position of a motor; JL, load inertia; Jm, motor inertia; K, a spring constant; D, a viscosity coefficient; and u, torque input (motor output torque) that is inputted to this vibration system. An equation of motion with respect to the motor is expressed as follows:

$$u = Jm \cdot \ddot{\theta}m + D(\dot{\theta}m - \dot{\theta}L) + K(\theta m - \theta L) \quad (1)$$

In the above equation (1), a symbol with two dots indicates a second-order derivative, and a symbol with one dot indicates a first-order derivative. For example, $\ddot{\theta}m$ indicates a second-order derivative of the motor position $\theta m$ and represent the acceleration of the motor. $\dot{\theta}m$ indicates a first-order derivative of the motor position $\theta m$ and represents the speed of the motor.

On the other hand, an equation of motion with respect to the load is expressed as follows:

$$0 = JL \cdot \ddot{\theta}L + D(\dot{\theta}L - \dot{\theta}m) + K(\theta L - \theta m) \quad (2)$$

The following equation (3) is obtained from the above equation (2):

$$\frac{\theta_L}{\theta_m} = \frac{Ds + K}{J_L s^2 + Ds + K} \quad (3)$$

where s is the Laplace operator.

The response characteristic according to the equation (3) from the motor position $\theta m$ to the position $\theta L$ of the control object such as an arm tip indicates that a displacement such as a bend or twist occurs between the motor position $\theta m$ and the control object position $\theta L$ during acceleration or deceleration. Therefore, it is impossible to avoid vibration at the control object position $\theta L$ even if the motor position $\theta m$ is controlled correctly.

Therefore, it is necessary to set the position loop gain smaller than the gain corresponding to the natural frequency determined by the equation (3). Alternatively, the mechanisms need to be so designed as to increase the natural frequency.

From the equations (1) and (2), a transfer function from the torque input u to the acceleration of the control object such as an arm tip is expressed by the following equation (4).

$$\frac{\ddot{\theta}_L}{u} = \frac{1}{J_L + J_m} \cdot \frac{Ds + K}{\frac{J_L J_m}{J_L + J_m} s^2 + Ds + K} \quad (4)$$

This transfer function shows that the system is a second-order vibration system. Therefore, in forming a control loop for the position or speed of the control object such as an arm tip, if the band (natural frequency) of equation (4) is low, it is impossible to obtain a sufficiently high band of the speed loop and, therefore, it is impossible either to obtain a sufficiently high band of the position loop.

However, in the prior art, a control loop is formed so that the response characteristic from the torque input u to the acceleration of the control point is indicated by the transfer function as follows:

$$\frac{\ddot{\theta}_L}{u} = \frac{1}{J_L + J_m} \quad (5)$$

Alternatively, a control loop is formed with an assumption that there is no displacement such as a bend or twist between the motor position and the control object, i.e., $\theta L = \theta m$. Therefore, as described above, it is difficult to prevent vibration from occurring at the control object such as an arm tip.

SUMMARY OF THE INVENTION

The present invention provides a vibration control method in which a sufficiently high frequency band is obtained and the vibration at the control object is effectively prevented, solving the aforementioned problems in the art, in a semi-closed loop control for controlling the position and speed of a servomotor so as to control the position and speed of a control object such as an arm tip, a workpiece or a tool.

In a vibration control method according to the invention, a displacement (bend or twist) between the position of a control object, such as the tip point of a robot arm, or a workpiece or a tool of a machine tool, and the position of a servomotor for drivingly controlling the robot or machine tool, and also the speed of the displacement are estimated by an observer. Then, a corrected torque command is determined by subtracting the value obtained by multiplying the estimated displacement amount and displacement speed by respective predetermined gains, from a torque command determined by position and speed feedback control of the servomotor. The respective predetermined gains to be multiplied by the displacement amount and the displacement speed are so adjusted as to stabilize a response from the torque command to the control object.

Particularly, the respective predetermined gains are adjusted so that the control characteristic is equivalent to that in feedback-controlling the motor by using the position and the speed of the control object.

DETAILED DESCRIPTION OF THE PREFERRED EMBODIMENT

Figure 3:
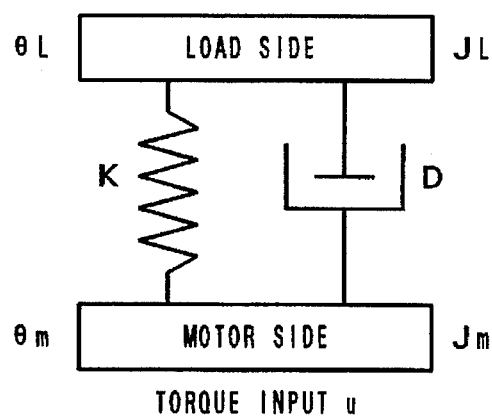
FIG. 3 shows a vibration system of a control object when modeled as a spring and damper system.

Referring to FIG. 3, a displacement (bend or twist) amount d1 between the motor position and the control object position and a displacement speed d2 ape given by the following equations (6) and (7).

$$d1 = \theta m - \theta L \tag{6}$$

$$d2 = \dot{\theta} m - \dot{\theta} L \tag{7}$$

Figure 1:
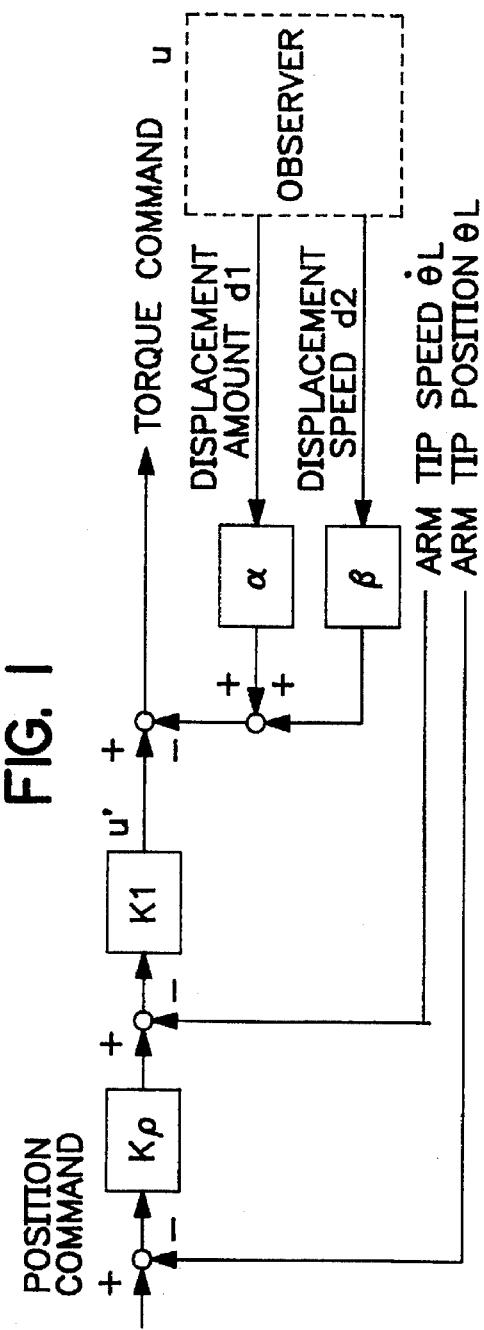
FIGS. 1 and 2 are schematic diagrams showing the principle of operation of the present invention.

As shown in FIG. 1, the displacement amount d1 and displacement speed d2 are fed back to a torque command u' which is obtained by position feedback control and speed feedback control of the control object. The corrected torque command u is expressed by the following equation (8).

$$u = u' - \alpha d1 - \beta d2 \tag{8}$$

where $\alpha$ and $\beta$ are adjustment values.

Substituting equations (6) and (7) into equation (8) and eliminating $\theta m$ using equation (3), we obtain the following equation (9).

$$u = u' - \frac{\alpha J_L s^2 + \beta J_L s^3}{Ds + K} \theta_L \tag{9}$$

Substituting equation (9) into equation (4), we obtain the following equation (10).

$$\frac{\ddot{\theta}_L}{u'} = \frac{1}{J_L + J_m} \cdot \frac{Ds + K}{\frac{J_L J_m}{J_L + J_m} s^2 + \left(D + \frac{J_L}{J_L + J_m}\beta\right)s + \left(K + \frac{J_L}{J_L + J_m}\alpha\right)} \tag{10}$$

The equation (10) indicates a response characteristic from the torque command to the acceleration of the control object. From the equation (10), it is perceived that the natural frequency and the damping can be changed by adjusting the adjustment values $\alpha$ and $\beta$. Therefore, it is possible to obtain a sufficiently high natural frequency (frequency band) and a high band of the servo system.

A block diagram of FIG. 1 shows a servo system for controlling the position and speed of the control object according to equation (8) so as to obtain the response characteristic of the control object, indicated by the equation (10). In FIG. 1, Kp and K1 represent a position loop gain and a speed loop gain (proportional gain), respectively.

Analyzing the servo System of FIG. 1, we obtain the following equation (11).

$$u = \{(Mc - \theta L)Kp - \dot{\theta}L\}K1 - (\alpha d1 + \beta d2). \tag{11}$$

Although the position and speed of the control object such as an arm tip are fed back in FIG. 1, they can not be detected actually. It is conceivable to perform control by estimating the position and speed of the control object by an observer, and forming a control loop using an estimated position and speed of the control object. However, forming a control loop using estimated quantities is not preferable. Therefore, the invention employs a method in which the torque command is determined by forming a control loop using the motor position and motor speed. The displacement amount and displacement speed are estimated by the observer, and an estimated displacement amount and displacement speed are fed back to the torque command.

Substituting equations (6) and (7) into equation (11), we obtain the following equation (12).

$$u = \{(Mc - \theta L)Kp - \dot{\theta}L\}K1 - \{\alpha(\theta m - \theta L) - \beta(\dot{\theta}m - \dot{\theta}L)\}. \tag{12}$$

$$\begin{aligned}
u &= \{(Mc - \theta m)Kp + (\theta m - \theta L)Kp - \dot{\theta}m + \\
&\quad (\dot{\theta}m - \dot{\theta}L)\}K1 - \{\alpha(\theta m - \theta L) + \beta(\dot{\theta}m - \dot{\theta}L)\} \\
&= \{(Mc - \theta m)Kp - \dot{\theta}m\}K1 + (\theta m - \theta L)KpK1 + \\
&\quad (\dot{\theta}m - \dot{\theta}L)K1 - \alpha(\theta m - \theta L) - \beta(\dot{\theta}m - \dot{\theta}L) \\
&= \{(Mc - \theta m)Kp - \dot{\theta}m\}K1 - (\alpha - KpK1)(\theta m - \theta L) - \\
&\quad (\beta - K1)(\dot{\theta}m - \dot{\theta}L) \\
&= \{(Mc - \theta m)Kp - \dot{\theta}m\}K1 - \{(\alpha - KpK1)(\theta m - \theta L) + \\
&\quad (\beta - K1)(\dot{\theta}m - \dot{\theta}L)\} \\
&= \{(Mc - \theta m)Kp - \dot{\theta}m\}K1 - \{(\alpha - KpK1)d1 + \\
&\quad (\beta - K1)d2\}
\end{aligned} \tag{13}$$

Figure 2:
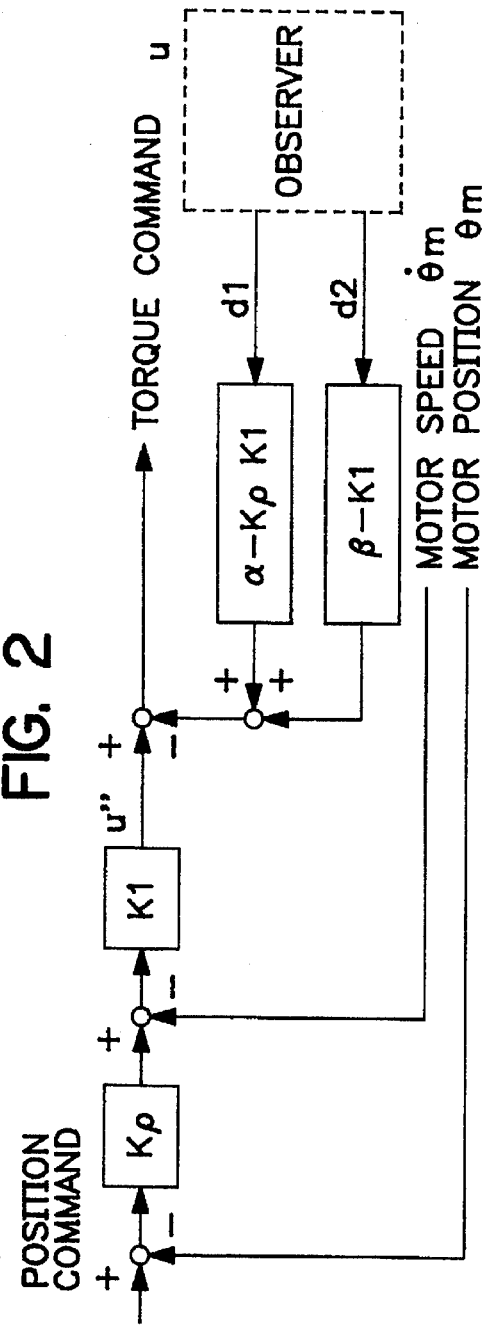

A block diagram of FIG. 2 shows a servo system which is constructed based on equation (13) using the feedback signals of position and speed of the motor. In this case, the displacement amount d1 and the displacement speed d2 have feedback gains ($\alpha$–KpK1) and ($\beta$–K1), respectively.

In the control system shown in FIG. 2, the control loop is formed by the actually measurable motor position and motor speed to determine a torque command u" by performing a position and speed loop control similar to that in the conventional system, and a torque command u for the motor is determined by feeding back the displacement amount d1 and the displacement speed d2 to the torque command u". The control system thus obtained is equivalent to the control system that is formed with respect to the control object such as an arm tip.

It is possible to completely eliminate vibration in the response characteristic from the torque command to the acceleration of the control object by adjusting the adjustment values $\alpha$ and $\beta$ in the feedback gain ($\alpha$–KpK1) of the variation d1 and the feedback gain ($\beta$–K1) of the variation speed d2.

Figure 4:
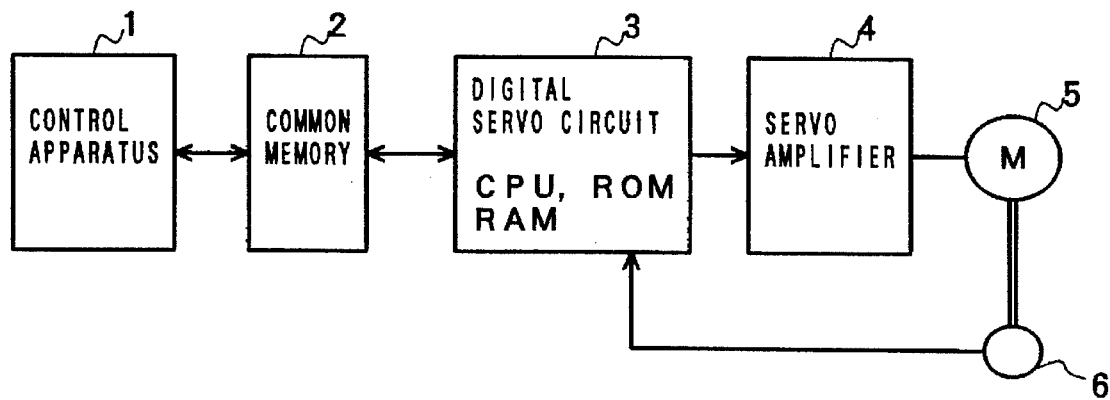
FIG. 4 is a block diagram showing the main part of a robot control apparatus for carrying out the invention.

FIG. 4 is a block diagram showing the main part of a robot control system for carrying out the invention. In FIG. 4, a controller 1 for controlling a robot performs interpolation, conversion from coordinate values of an orthogonal coordinate system to rotational angles of respective axes of the robot and inverse conversion thereof, and distributes position commands for the respective axes. A common memory 2 intermediates information between a processor of the controller 1 and a processor of a digital servo circuit 3. Thus, the common memory 2 transfers data such as a position command from the processor of the controller 1 to the processor of the digital servo circuit 3, and transfers various kinds of information from the processor of the digital servo circuit 3 to the processor of the controller 1. The digital servo circuit 3 which comprises a digital signal processor, a ROM and a RAM, controls servomotors of respective axes of the robot, and also performs processing for the vibration control method of the invention. A servo amplifier 4 comprises a transistor inverter. A pulse coder 6 detects the position and speed of a servomotor 5, and the detected position and speed are fed back to the digital servo circuit 3. It is noted that the digital servo circuit 3, servo amplifier 4 and servomotor 5 shown in FIG. 4 are only for one axis of the robot.

Figure 5:
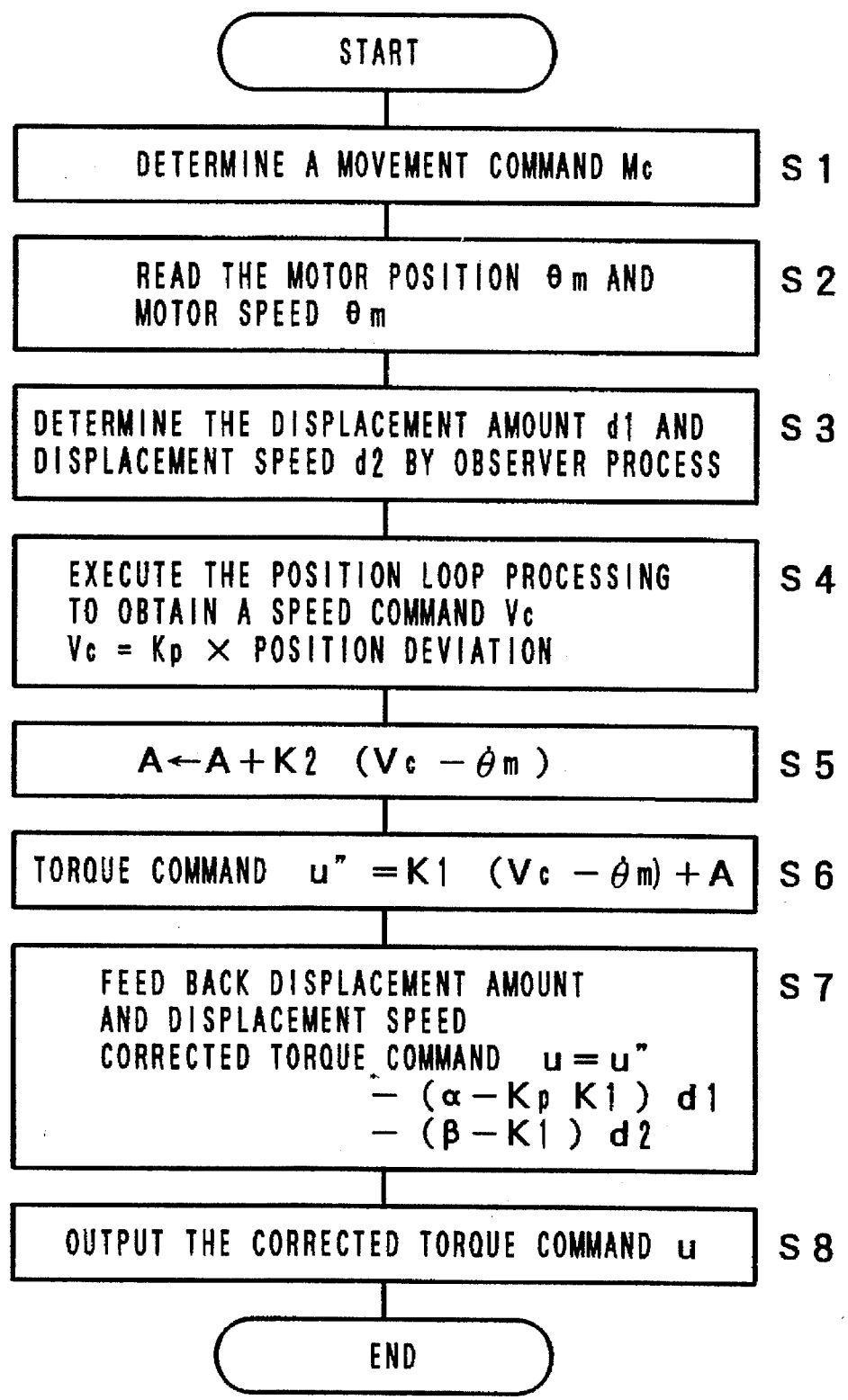
FIG. 5 is a flowchart showing a processing executed by the digital servo circuit of the robot control apparatus shown in FIG. 4 in each position and speed loop processing period.

FIG. 5 is a flowchart showing a control processing of the servomotor which is executed by the processor of the digital servo circuit 3 according to the invention. The processor executes the processing shown in FIG. 5 in each predetermined period (position and speed loop processing period).

First, adjustment values α and β, which are experimentally predetermined so that a response of an arm tip (control object) with respect to a torque input is stable, are set in a memory of the digital servo circuit 3. The position loop gain Kp and the speed loop gain (proportional gain) K1 of the ordinary position loop and speed loop control are set, as well as the integration constants of the speed loop control to enable integration processing as in the ordinary servomotor control. The integration control is performed to eliminate influences of a disturbance (offset disturbance due to a torque offset etc.) which may be imposed on the observer-estimated values of the displacement amount d1 and the displacement speed d2.

The processor of the digital servo circuit 3 determines a movement command Mc for each position and speed loop processing period based on a move command that is sent from the controller 1 through the common memory 2 (step S1), and reads the motor position θm and the motor speed θm which are fed back from the pulse coder 6 (step S2). Then, the processor determines the displacement amount d1 and the displacement speed d2 for the current period by executing the conventional observer processing based on the motor speed θm thus read, the torque command u" determined in the preceding period, and the displacement amount d1 and the displacement speed d2 also determined in the preceding period (step S3). The above observer processing is described in detail in International Application No. PCT/JP90/01130 (International Laid-Open No. WO 91/03780), for example.

Then, the processor performs position loop processing according to the conventional method in which a positional deviation is determined by accumulating the value obtained by subtracting the motor position determined in step S2 from the movement command Mc determined in step S1, and a speed command Vc is determined by multiplying the positional deviation by the position loop gain Kp (step S4). Then, the processor determines an integrated value by accumulating, to an accumulator A which serves as the integrator, a value obtained by multiplying a predetermined integration gain K2 by a speed deviation which is obtained by subtracting the motor speed θm from the above-determined speed command Vc (step S5). Further, the processor determines the torque command u" by accumulating, to the accumulator A, a value which is obtained by multiplying the above speed variation by the proportional gain K1 (step S6). The above processing of steps S5 and S6 is a PI (proportional plus integral) control in a speed loop processing which is similar to that in the conventional control system.

The processor determines a corrected torque command u by subtracting, from the above-determined torque command u", a value obtained by multiplying the displacement amount d1 estimated in step S3 by the preset feedback gain (α−KpK1), and a value obtained by multiplying the deviation speed d2 by the feedback gain (β−K1) (step S7). The processor transfers the corrected torque command u to a electric current loop processing and finishes the processing for the present position and speed loop processing period (step S8). The electric current loop processing is executed based on the corrected torque command so as to control an electric current for driving the servomotor.

Although the invention is applied to the robot control in the above embodiment, the invention can also be applied to servomotor control of a machine tool. In such case, vibration is prevented from occurring at a workpiece position or a tool position (control object).

In the above embodiment, disturbance torque may be included in the estimated values of the displacement amount and the displacement speed. To improve the control accuracy, a disturbance estimating observer may be employed to estimate disturbance, to thereby eliminate influences of the disturbance from the displacement amount and displacement speed.

According to the invention, vibration is prevented from occurring at the control object by correcting the torque command by using the estimated value of the displacement amount which is caused by a bend, a twist, etc. of the mechanism from the servomotor to the control object. Therefore, the control system becomes stable, and vibration is prevented from occurring at the control object such as an arm tip. As a result, the frequency band is made high. Further, the invention provides the effects equivalent to those that is obtained when a control loop is formed using the detected signals of the position and speed of the control object.

What is claimed is:

1. A vibration control method for controlling a position and a speed of a control object by controlling a position and a speed of a servomotor, comprising the steps of:

estimating a displacement between the position of the servomotor and the position of the control object and estimating a speed of the displacement by an observer;

determining a torque command based on a position and speed feedback control of the servomotor;

determining a first adjustment value and a second adjustment value which stabilize a response from the torque command to the control object; determining a first predetermined gain based on the first adjustment value and determining a second predetermined gain based on the second adjustment value;

multiplying the estimated displacement by the first predetermined gain to obtain a first value and multiplying the estimated speed by the second predetermined gain to obtain a second value; and determining a corrected torque command as a command to the servomotor by subtracting said first and second values from said torque command.

2. The vibration control method according to claim 1, wherein said step of determining said first and second adjustment values includes the step of making a control characteristic equivalent to that in feedback-controlling the servomotor using the position and the speed of the control object.

3. The vibration control method according to claim 1, wherein said step of determining said first and second predetermined gains includes the steps of multiplying Kp by K1 and subtracting KpK1 from α to determine the first predetermined gain and subtracting K1 from β to determine the second predetermined gain, where Kp is a position loop gain of the position feedback control; K1 is a speed loop gain of the speed feedback control, α is the first adjustment value and G is the second adjustment value.

* * * * *